United States Patent
Nagel et al.

(10) Patent No.: US 11,834,021 B2
(45) Date of Patent: Dec. 5, 2023

(54) BRAKING FORCE GENERATOR FOR A BRAKING SYSTEM, ACTUATING UNIT FOR A BRAKING SYSTEM

(71) Applicant: Robert Bosch GmbH, Stuttgart (DE)

(72) Inventors: Willi Nagel, Hochdorf (DE); Michael Osses, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 194 days.

(21) Appl. No.: 17/165,383

(22) Filed: Feb. 2, 2021

(65) Prior Publication Data
US 2021/0323527 A1 Oct. 21, 2021

(30) Foreign Application Priority Data
Apr. 17, 2020 (DE) .......................... 102020204887.8

(51) Int. Cl.
*B60T 13/74* (2006.01)
*F16D 65/28* (2006.01)
*F16D 121/24* (2012.01)

(52) U.S. Cl.
CPC .......... *B60T 13/746* (2013.01); *B60T 13/745* (2013.01); *F16D 65/28* (2013.01); *F16D 2121/24* (2013.01)

(58) Field of Classification Search
CPC ................ B60T 13/745; B60T 13/746; F16H 2025/2087; F16D 2121/24; F16D 2125/34; F16D 2125/40; F16D 2125/50; F16D 65/28; F15B 7/08
See application file for complete search history.

(56) References Cited

U.S. PATENT DOCUMENTS

| 3,435,922 | A | * | 4/1969 | Franz | F16D 65/18 188/106 F |
| 3,734,254 | A | * | 5/1973 | Yanikoshi | F16D 67/02 192/223.1 |
| 2011/0278109 | A1 | * | 11/2011 | No | F16D 65/18 188/72.6 |
| 2013/0087417 | A1 | * | 4/2013 | Yu | B60T 13/741 188/72.3 |

(Continued)

FOREIGN PATENT DOCUMENTS

WO WO-2017153964 A1 * 9/2017 .............. B60T 1/067

*Primary Examiner* — Nicholas J Lane
*Assistant Examiner* — Stephen M Bowes
(74) *Attorney, Agent, or Firm* — NORTON ROSE FULBRIGHT US LLP; Gerard Messina

(57) ABSTRACT

A braking force generator for a braking system. The braking force generator includes a drive shaft, rotatably mounted in a housing, an electric motor, which includes a rotor and at least one motor winding, an actuating element, which is displaceably mounted, and a transmission unit, which operates between the drive shaft and the actuating element in such a way that the actuating element is displaced during a rotation of the drive shaft. The transmission unit includes a planetary gear set encompassing a sun wheel connected to the drive shaft in a rotatably fixed manner, a rotatably mounted planet carrier, at least one planet wheel rotatably mounted at the planet carrier, and an output toothing assigned to the actuating element. The output toothing is formed in a lateral wall of an end area of the planet carrier facing away from the electric motor.

11 Claims, 4 Drawing Sheets

(56) References Cited

U.S. PATENT DOCUMENTS

| | | | |
|---|---|---|---|
| 2013/0270047 A1* | 10/2013 | Kim | F16D 65/18 188/72.1 |
| 2014/0000993 A1* | 1/2014 | No | F16D 65/18 188/72.8 |
| 2016/0273602 A1* | 9/2016 | Poertzgen | B60T 13/741 |
| 2017/0082159 A1* | 3/2017 | Son | F16D 65/0006 |
| 2019/0093750 A1* | 3/2019 | Matsuto | F16H 57/021 |
| 2020/0165856 A1* | 5/2020 | Scheuring | F16H 1/46 |
| 2020/0189549 A1* | 6/2020 | Mazzarini | B60T 13/746 |

* cited by examiner

BRAKING FORCE GENERATOR FOR A BRAKING SYSTEM, ACTUATING UNIT FOR A BRAKING SYSTEM

CROSS REFERENCE

The present application claims the benefit under 35 U.S.C. § 119 of German Patent Application No. DE 102020204887.8 filed on Apr. 17, 2020, which is expressly incorporated herein by reference in its entirety.

FIELD

The present invention relates to a braking force generator for a braking system, including a drive shaft, which is rotatably mounted in a housing of the braking force generator, an electric motor, which includes a rotor and at least one motor winding, the rotor being situated on the drive shaft in a rotatably fixed manner and being rotatable via an energization of the motor winding, including an actuating element, which is displaceably mounted, and including a transmission unit, which operates between the drive shaft and the actuating element in such a way that the actuating element is displaced during a rotation of the drive shaft, the transmission unit including a planetary gear set, which encompasses a sun wheel connected to the drive shaft in a rotatably fixed manner, a rotatably mounted planet carrier, at least one planet wheel rotatably mounted at the planet carrier, and an output toothing assigned to the actuating element.

In addition, the present invention relates to an actuating unit including a braking force generator of the type mentioned at the outset.

BACKGROUND INFORMATION

A hydraulic braking system of a motor vehicle generally includes at least one friction brake unit. In order to actuate the friction brake unit, the braking system usually includes an actuating unit encompassing a main brake cylinder, in which at least one hydraulic piston is displaceably mounted. The main brake cylinder is fluidically connected to a slave cylinder of the friction brake unit. In order to actuate the friction brake unit, the hydraulic cylinder is displaced in such a way that a hydraulic fluid is displaced out of the main brake cylinder into the slave cylinder.

Increasingly, in automobile manufacturing, actuating units including a braking force generator are installed, with the aid of which an electromotive displacement of the hydraulic piston and, thereby, an electromotive actuation of the friction brake unit are possible. For example, actuating units of the iBooster type of the applicant include such a braking force generator. The braking force generator includes a drive shaft, which is rotatably mounted in a housing of the braking force generator. In addition, the braking force generator includes an electric motor, which encompasses a rotor and at least one, in particular, multi-phase motor winding. The rotor is situated on the drive shaft in a rotatably fixed manner and is rotatable via a suitable energization of the motor winding, the drive shaft then being rotated together with the rotor. The motor winding is, for example, a stator winding, fixed to the housing, or a rotor winding, which is rotatable together with the rotor.

The braking force generator also includes an actuating element, which is displaceably mounted. In addition, a transmission unit is provided, which operates between the drive shaft and the actuating element in such a way that the actuating element is displaced during a rotation of the drive shaft. The transmission unit is therefore designed for converting a rotary motion of the drive shaft into a translatory motion of the actuating element. For this purpose, the transmission unit usually includes a planetary gear set, which encompasses a sun wheel connected to the drive shaft in a rotatably fixed manner, a rotatably mounted planet carrier, at least one planet wheel rotatably mounted at the planet carrier, and an output toothing assigned to the actuating element.

SUMMARY

In a braking force generator according to an example embodiment of the present invention, the output toothing is formed in a lateral wall of an end area of the planet carrier facing away from the electric motor. In contrast thereto, it is conventional from the related art to mount an additional gear wheel including the output toothing on an end area of the planet carrier, which is then designed in the shape of a rod. This requires, however, relatively high manufacturing costs, because the end area designed in the shape of a rod and the additional gear wheel must be produced with preferably low component tolerances. By comparison, the approach according to the present invention is more cost-effective, because the planet carrier itself includes the output toothing, i.e., the transmission output of the planetary gear set, so that the additional gear wheel is not necessary. Preferably, the planetary gear set includes multiple planet wheels, which are rotatably mounted at the planet carrier. It is particularly preferred when the planet wheels, uniformly distributed in the circumferential direction of the planet carrier, are rotatably mounted at the planet carrier.

Preferably, the output shaft and the planet carrier are mounted so as to be rotatable about the same rotation axis. If the terms "axial" or "radial" are utilized within the scope of the disclosure, the terms relate to this rotation axis, unless another reference is expressly mentioned. Preferably, the actuating element is axially displaceably mounted. The actuating element is therefore displaceable along the rotation axis or along an axis, which extends in parallel to the rotation axis and radially spaced apart from the rotation axis.

Preferably, the planet carrier is made of plastic. As a result, the planet carrier is cost-effectively manufacturable. It is particularly preferred when the planet carrier is produced as an injection molded part, i.e., with the aid of injection molding. As a result, complex geometries, such as, for example, the output toothing, are also manufacturable in a technically simple manner.

According to one preferred specific embodiment of the present invention, it is provided that the output toothing meshes directly with a toothing of the actuating element, or that at least one further transmission element of the transmission unit operates between the output toothing and the actuating element. If the output toothing meshes directly with the toothing of the actuating element, only a few components are needed for forming the transmission unit, so that the transmission unit is designable in an installation space-saving manner. If the further transmission element is present, the output toothing operates indirectly upon the actuating element. Preferably, the further transmission element forms a second transmission stage of the transmission unit, which is present in addition to a first transmission stage formed by the planetary gear set.

Therefore, the transmission unit is designed to be multi-stage. Due to the multi-stage design of the transmission unit, the actuating element may be displaced in a particularly precise manner.

Preferably, the output toothing is formed in a lateral outer wall of the end area. Due to the formation of the output toothing in the lateral outer wall, the output toothing is technically easily accessible so that the output toothing may be easily brought into a meshing engagement with a toothing of the further transmission element or the toothing of the actuating element.

According to one preferred specific embodiment of the present invention, it is provided that the transmission unit includes a second planetary gear set, a second sun wheel of the second planetary gear set being formed by the output toothing. Due to the provision of the second planetary gear set, a second transmission stage is provided, whereby the actuating element may be displaced in a particularly precise manner. Since the second sun wheel of the second planetary gear set is formed by the output toothing, the planetary gear set and the second planetary gear set are situated coaxially to one another. Due to the provision of the second planetary gear set, therefore, the radial extension of the transmission unit is not or is only slightly enlarged. Correspondingly, due to the provision of the second planetary gear set, a second transmission stage is provided in an installation space-saving manner.

Preferably, the end area is designed in the shape of a hollow shaft, the output toothing being formed in a lateral inner wall of the hollow shaft-shaped end area. The end area is therefore designed as a spindle nut. This specific embodiment of the end area is particularly suitable for interacting directly with the actuating element. Preferably, the actuating element is designed as a threaded spindle and is screwed into the hollow shaft-shaped end area. Advantageously, an anti-rotation device is then assigned to the actuating element designed as a threaded spindle, so that the actuating element does not rotate, but rather is axially displaced during a rotation of the drive shaft and, thereby, of the planet carrier.

According to one preferred specific embodiment of the present invention, it is provided that the planet carrier is injection-molded onto a metallic support rod with the aid of injection molding. Therefore, a support rod is provided, which is extrusion-coated with plastic, in order to maintain the planet carrier. The metallic support rod has a high stability, so that the stability of the planet carrier is increased by injection molding the planet carrier onto the support rod.

Preferably, the braking force generator includes a bearing transmitting a radial force, the support rod for supporting the planet carrier resting radially against a first bearing ring of the bearing. Due to the high stability of the metallic support rod, the metallic support rod is particularly suitable for supporting the planet carrier. Preferably, an end of the support rod facing away from the electric motor is free of the planet carrier, this end of the support rod resting radially against the first bearing ring of the bearing.

In the actuating unit according to an example embodiment of the present invention for a braking system includes a main brake cylinder, in which a hydraulic piston is displaceably mounted, and, includes the example braking force generator according to the present invention, the hydraulic piston being displaceable by a displacement of the actuating element. The aforementioned advantages also result therefrom. Further preferred features and combinations of features result from the description herein and the figures. Preferably, the hydraulic piston is axially displaceable. The hydraulic piston is therefore displaceable along the rotation axis or along an axis, which extends in parallel to the rotation axis and is radially spaced apart from the rotation axis. Preferably, the actuating element rests indirectly against the hydraulic piston during the displacement of the hydraulic piston. Therefore, at least one further displaceable element is present between the actuating element and the hydraulic piston. Alternatively, the actuating element rests directly, i.e., immediately, against the hydraulic piston during the displacement of the hydraulic piston.

The present invention is explained in greater detail below based on the figures.

DETAILED DESCRIPTION OF EXAMPLE EMBODIMENTS

Figure 1:
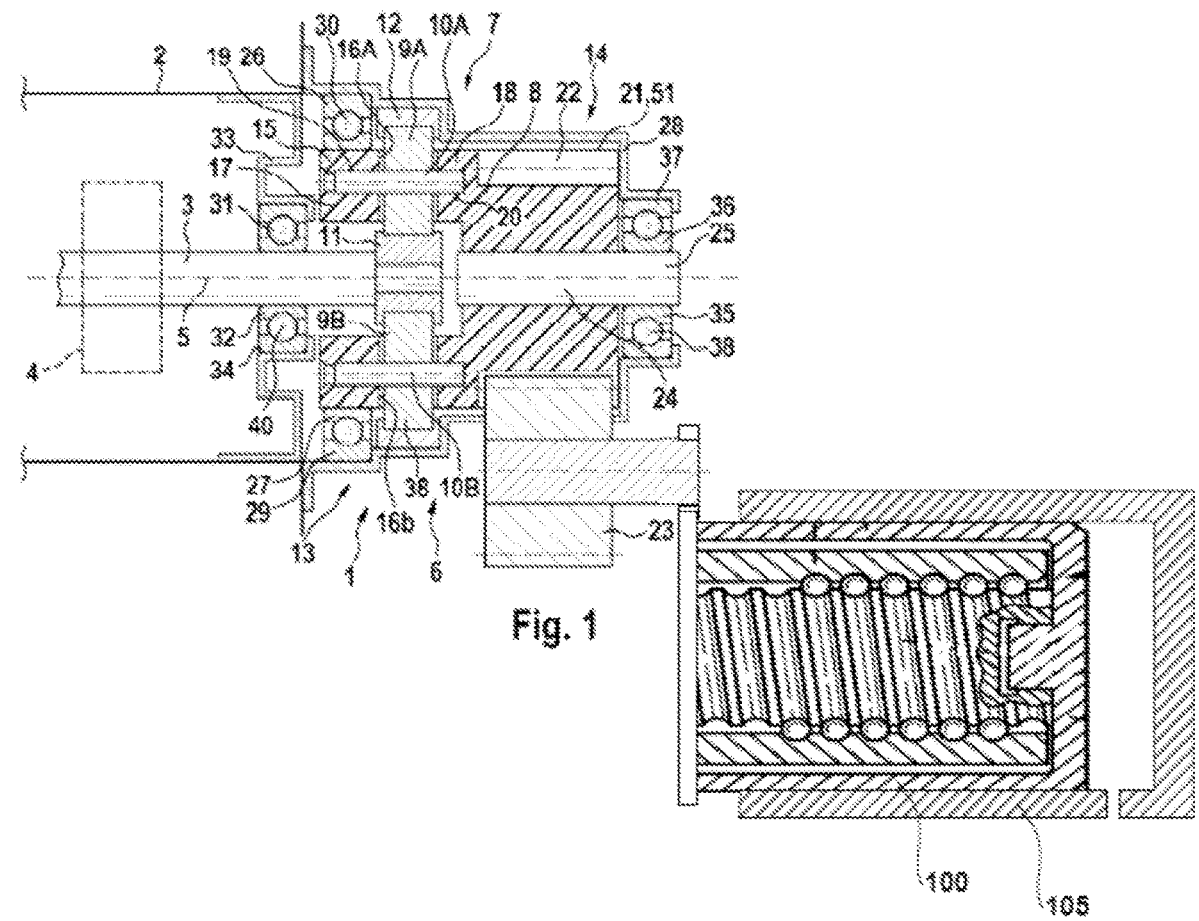
FIG. 1 shows a first exemplary embodiment of a braking force generator of an actuating unit of a braking system, in accordance with the present invention.

FIG. 1 shows a first exemplary embodiment of a braking force generator 1 of an actuating unit (not represented) of a hydraulic braking system. The hydraulic braking system includes multiple friction brake units. The actuating unit is designed for actuating the friction brake units, in order to generate a friction braking torque with the aid of the friction brake units. For this purpose, the actuating unit includes a main brake cylinder, in which at least one hydraulic piston is displaceably mounted. Generally, the main brake cylinder is a tandem main brake cylinder, so that usually two hydraulic pistons are displaceably mounted in the main brake cylinder. The main brake cylinder is fluidically connected to slave cylinders of the friction brake unit. If the hydraulic pistons are displaced in an actuating direction, a hydraulic fluid is displaced out of the main brake cylinder into the slave cylinders and a friction braking torque is generated. FIG. 1 schematically shows a connection to a hydraulic piston 100 that can be translated within an example main brake cylinder 105.

Actuating unit 1 is designed for displacing the hydraulic pistons electromotively and, thereby, actuating the friction brake electromotively. Such a principle is basically known from actuating units of the iBooster type of the applicant.

Actuating unit 1 includes a housing 2, in which a drive shaft 3 is rotatably mounted. Drive shaft 3 is mounted so as to be rotatable about a rotation axis 5. Actuating unit 1 also includes an electric motor 4, which is merely schematically represented. Electric motor 4 includes a rotor and a multiphase motor winding. The rotor is situated on drive shaft 3 in a rotatably fixed manner and is rotatable via an energization of the motor winding, drive shaft 3 then rotating together with the rotor. The motor winding is, for example, a stator winding, fixed to the housing, which is situated so as to be distributed around the rotor.

Actuating unit 1 also includes an actuating element (not represented at least in FIG. 1), which is axially displaceably mounted, i.e., along rotation axis 5 or along an axis, which extends in parallel to rotation axis 5 and is radially spaced apart from rotation axis 5.

Actuating unit 1 also includes a transmission unit 6, which operates between drive shaft 3 and the actuating element in such a way that the actuating element is displaced during a rotation of drive shaft 3. The actuating element is coupled to the hydraulic pistons in such a way that the hydraulic pistons are displaced with the actuating element when the actuating element is displaced in the actuating direction.

Transmission unit 6 includes a planetary gear set 7. Planetary gear set 7 includes a sun wheel 11, which is connected to drive shaft 3 in a rotationally fixed manner. In addition, planetary gear set 7 includes a planet carrier 8, which is mounted so as to be rotatable about rotation axis 5. In addition, planetary gear set 7 includes multiple planet wheels, which are rotatably mounted on planet carrier 8 and whose toothings mesh with a toothing of sun wheel 11. In the present case, a first planet wheel 9A, a second planet wheel 9B, and a third planet wheel are present, only first planet wheel 9A and second planet wheel 9B being apparent. First planet wheel 9A is rotatably mounted at planet carrier 8 with the aid of a metallic first planet wheel shaft 10A. Second planet wheel 9B is rotatably mounted at planet carrier 8 with the aid of a metallic second planet wheel shaft 10B. The third planet wheel is rotatably mounted at planet carrier 8 with the aid of a metallic third planet wheel shaft. If the structural design of one of the planet wheels or the structural design of one of the planet wheel shafts is described in the following, this structural design is also implemented in the other planet wheels or in the other planet wheel shafts, respectively. Planetary gear set 7 also includes an annulus gear 12, fixed to the housing, the toothings of the planet wheels also meshing with a toothing of annulus gear 12.

Planet carrier 8 is made of plastic as an injection molded part, i.e., with the aid of injection molding. Planet carrier 8 includes a first end area 13 facing electric motor 4 and a second end area 14 facing away from electric motor 4.

First end area 13 is designed as a hollow shaft section 13. Therefore, end area 13 is designed in the shape of a cylinder. A lateral wall 15 of hollow shaft section 13 includes a number of radial breakthroughs corresponding to the number of planet wheels. One of the radial breakthroughs, in each case, is assigned to each of the planet wheels and the planet wheels lie within the radial breakthroughs. For example, first planet wheel 9A lies within a first radial breakthrough 16A. Second planet wheel 9B lies within a second radial breakthrough 16B.

The planet wheel shafts are mounted in hollow shaft section 13 on both sides of the planet wheels. This is explained in greater detail in the following with reference to first planet wheel shaft 10A. Hollow shaft section 13 includes a first bearing section 17 and a second bearing section 18. First bearing section 17 includes an axial breakthrough 19. Second bearing section 18 includes an axial recess 20, which is aligned with axial breakthrough 19. First planet wheel shaft 10A is mounted in axial breakthrough 19 as well as in axial recess 20. First planet wheel shaft 10A is fixedly connected, preferably with the aid of a press fit, to planet carrier 8 in the area of axial breakthrough 19 and in the area of axial recess 20. In order to install first planet wheel 9A, first planet wheel 9A is initially placed into radial breakthrough 16A. Thereafter, planet wheel shaft 10A is inserted through axial breakthrough 19 and a central recess of first planet wheel 9A and inserted into axial recess 20 until a front—in the insertion direction—end of planet wheel shaft 10A rests axially against a base of axial recess 20. Planet wheel shaft 10A is dimensioned in such a way that, in the inserted state of planet wheel shaft 10A, a rear—in the insertion direction—area of axial breakthrough 19 is free of planet wheel shaft 10A. In order to axially fix planet wheel shaft 10A, this area of axial breakthrough 19 is formed with the aid of heat staking. In the present case, first bearing section 17 is situated closer to electric motor 4 than second bearing section 18.

Second end area 14 of planet carrier 8 facing away from electric motor 4 includes a lateral wall 21, in which an output toothing 22, i.e., a transmission output of planetary gear set 7, is formed. Planet carrier 8, which is made of plastic, therefore includes output toothing 22. According to the exemplary embodiment represented in FIG. 1, lateral wall 21 is a lateral outer wall 51 of second end area 14 of planet carrier 8.

According to the exemplary embodiment represented in FIG. 1, transmission unit 6 includes one further transmission element 23, namely a gear wheel 23, whose toothing meshes with output toothing 22. At least one further transmission element of transmission unit 6 therefore operates between output toothing 22 and the actuating element (not represented). If the actuating element were represented, a toothing of the actuating element would mesh, for example, with the toothing of gear wheel 23. Alternatively, at least one further transmission element, such as, for example, a threaded nut, would be present between gear wheel 23 and the actuating element. In addition, an anti-rotation device would be assigned to the actuating element, in order to avoid a rotation of the actuating element.

According to the exemplary embodiment represented in FIG. 1, planet carrier 8 is injection-molded onto a metallic support rod 24, in order to increase the stability of planet carrier 8. Support rod 24 extends, in the present case, through second end area 14 of planet carrier 8. An end 25 of support rod 24 facing away from electric motor 4 is free of planet carrier 8 made of plastic.

Braking force generator 1 also includes a radial force-transmitting first bearing 26. First bearing 26 is situated between the planet wheels, on the one hand, and electric motor 4, on the other hand. Hollow shaft section 13 rests radially from the inside against a first bearing ring 27 of first bearing 26. A first bearing shield 28, fixed to the housing, rests radially from the outside against a second bearing ring 29 of first bearing 26. Multiple rolling elements 30 are situated between first bearing ring 27 and second bearing ring 29.

Therefore, first bearing 26 according to the exemplary embodiment represented in FIG. 1 is designed as a rolling element bearing 26. First bearing ring 27 forms the inner bearing ring of first bearing 26 and second bearing ring 29 forms the outer bearing ring of first bearing 26.

Braking force generator 1 also includes a radial force-transmitting second bearing 31. Second bearing 31 is situated between first bearing 26, on the one hand, and electric motor 4, on the other hand. Drive shaft 3 rests radially from the inside against a first bearing ring 32 of second bearing 31. A second bearing shield 33, fixed to the housing, rests radially from the outside against a second bearing ring 34 of second bearing 31. Multiple rolling elements 40 are situated between first bearing ring 32 and second bearing ring 34. Therefore, second bearing 31 according to the exemplary embodiment represented in FIG. 1 is also designed as a rolling element bearing 31.

Braking force generator 1 also includes a radial force-transmitting third bearing 35. End 25 of support rod 24 rests radially from the inside against a first bearing ring 36 of third bearing 35. First bearing shield 28 rests radially from the outside against a second bearing ring 37 of third bearing 35. Multiple rolling elements 38 are situated between first bearing ring 36 and second bearing ring 37. Therefore, third bearing 36 according to the exemplary embodiment represented in FIG. 1 is also designed as a rolling element bearing 36.

Figure 2:
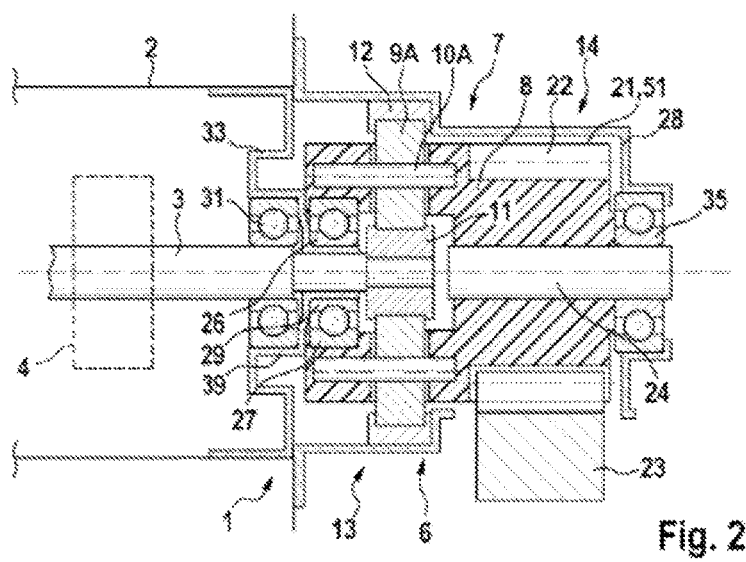
FIG. 2 shows a second exemplary embodiment of the braking force generator, in accordance with the present invention.

FIG. 2 shows braking force generator 1 according to a second exemplary embodiment. Braking force generator 1 represented in FIG. 2 differs from braking force generator 1 represented in FIG. 1, in particular, with respect to the design of first bearing 26. According to the exemplary embodiment represented in FIG. 2, hollow shaft section 13 rests radially from the outside against first bearing ring 27 of first bearing 26. Second bearing shield 33 rests radially from the inside against second bearing ring 29 of first bearing 26. Second bearing shield 33 therefore rests radially from the outside against second bearing ring 34 of second bearing 31, on the one hand, and, on the other hand, radially from the inside against second bearing ring 29 of first bearing 26. For this purpose, a free end section 39 of second bearing shield 33 includes a stepped profile in the area of bearings 26 and 31. According to the exemplary embodiment represented in FIG. 2, first bearing ring 27 forms the outer bearing ring of first bearing 26 and second bearing ring 29 forms the inner bearing ring of first bearing 26.

Figure 3:
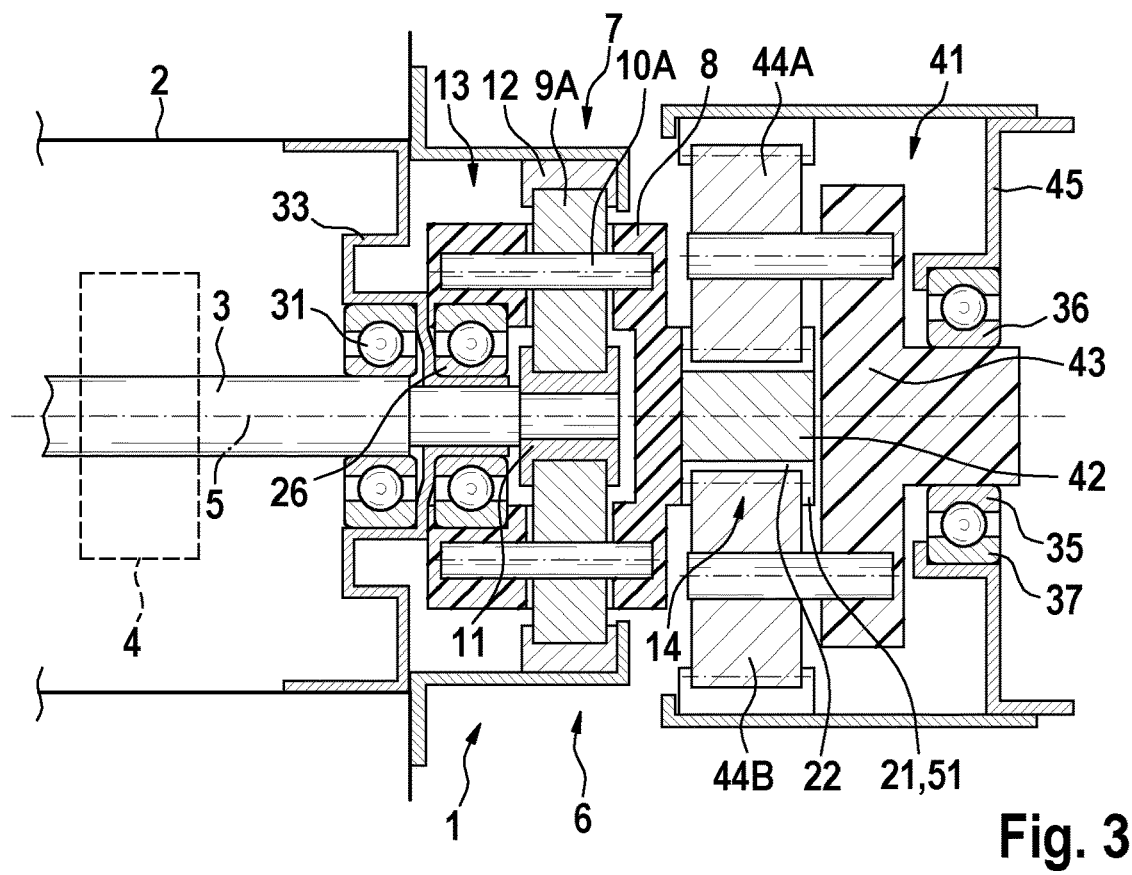
FIG. 3 shows a third exemplary embodiment of the braking force generator, in accordance with the present invention.

FIG. 3 shows braking force generator 1 according to a third exemplary embodiment. Braking force generator 1 represented in FIG. 3 differs from braking force generator 1 represented in FIG. 2, in particular, with respect to the design of second end area 14 of planet carrier 8. According to the exemplary embodiment represented in FIG. 3, transmission unit 6 includes a second planetary gear set 41. A second sun wheel 42 of second planetary gear set 41 is formed by output toothing 22 of lateral wall 21 of second end area 14 of planet carrier 8. Second planetary gear set 41 includes a second planet carrier 43, which is rotatably mounted. Preferably, second planet carrier 43 is also made of plastic, preferably with the aid of injection molding. Three planet wheels are rotatably mounted at second planet carrier 43, of which only a fourth planet wheel 44A and a fifth planet wheel 44B are apparent in FIG. 3. According to the exemplary embodiment represented in FIG. 3, second planet carrier 43 rests radially from the inside against first bearing ring 36 of third bearing 35. A further bearing shield 45, fixed to the housing, rests radially from the outside against second bearing ring 37 of third bearing 35. If the actuating element were represented, a toothing of the actuating element would mesh, for example, with an output toothing of second planet carrier 43. Alternatively, at least one further transmission element would be present between the output toothing of the second planet carrier and the actuating element. In addition, an anti-rotation device would be assigned to the actuating element, in order to avoid a rotation of the actuating element.

Figure 4:
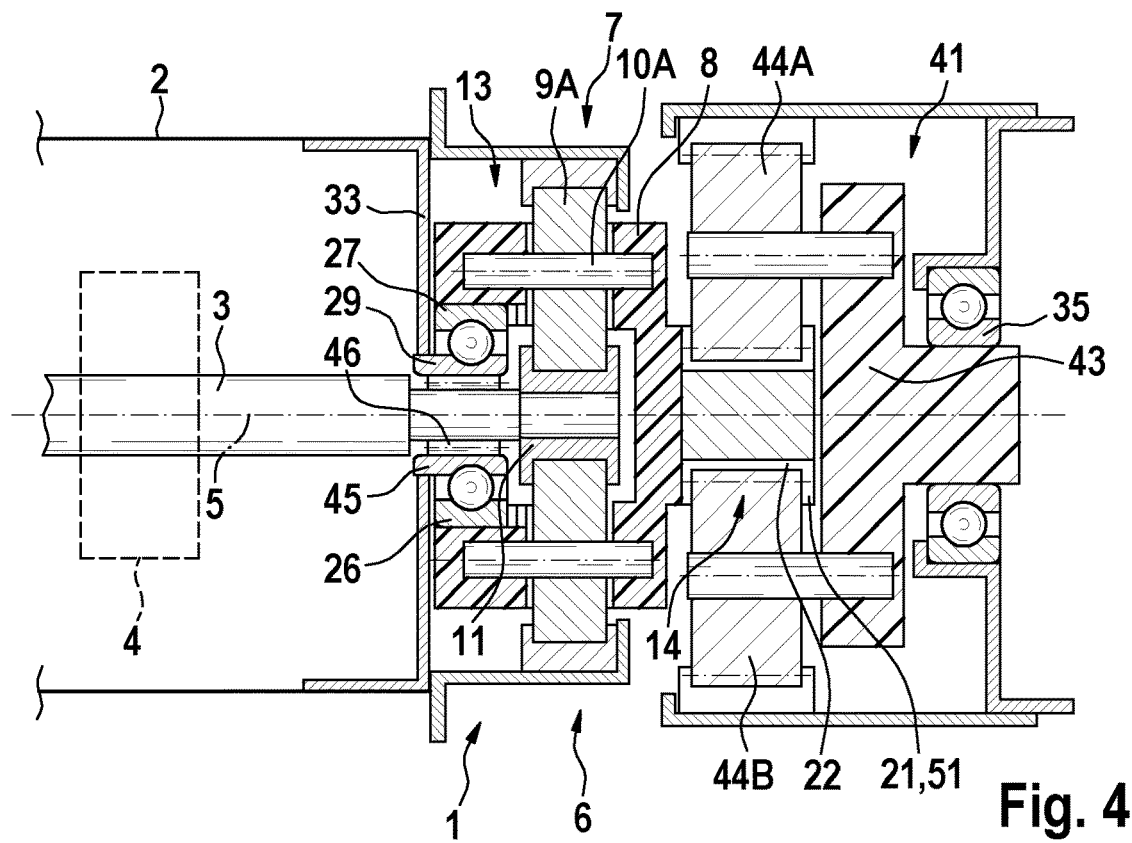
FIG. 4 shows a fourth exemplary embodiment of the braking force generator, in accordance with the present invention.

FIG. 4 shows braking force generator 1 according to a fourth exemplary embodiment. Braking force generator 1 represented in FIG. 4 differs from braking force generator 1 represented in FIG. 3, in particular, with respect to the design of the mounting of drive shaft 3 and the mounting of planet carrier 8. According to the exemplary embodiment represented in FIG. 4, second bearing 31 is dispensed with. Instead, planet carrier 8 as well as drive shaft 3 is rotatably mounted with the aid of first bearing 26. First bearing ring 27 forms the outer bearing ring of first bearing 26. Hollow shaft section 13 rests radially from the outside against first bearing ring 27. Second bearing ring 29 forms the inner bearing ring of first bearing 26. In order to ensure that second bearing shield 33 may nevertheless rest radially from the outside against second bearing ring 29, second bearing ring 29 includes a second axial projection 45, which projects axially from first bearing 26 in the direction of electric motor 4. Second bearing shield 33 rests radially from the outside against second axial projection 45. Drive shaft 3 rests radially from the inside against second bearing ring 29 with the aid of a needle cage 46. Alternatively, drive shaft 3 rests radially from the inside against a third bearing ring, which then forms the inner bearing ring of first bearing 26, so that second bearing ring 29 forms a middle bearing ring of first bearing 26. Advantageously, multiple rolling elements or a sliding medium are/is then situated between second bearing ring 29 and the third bearing ring.

Figure 5:
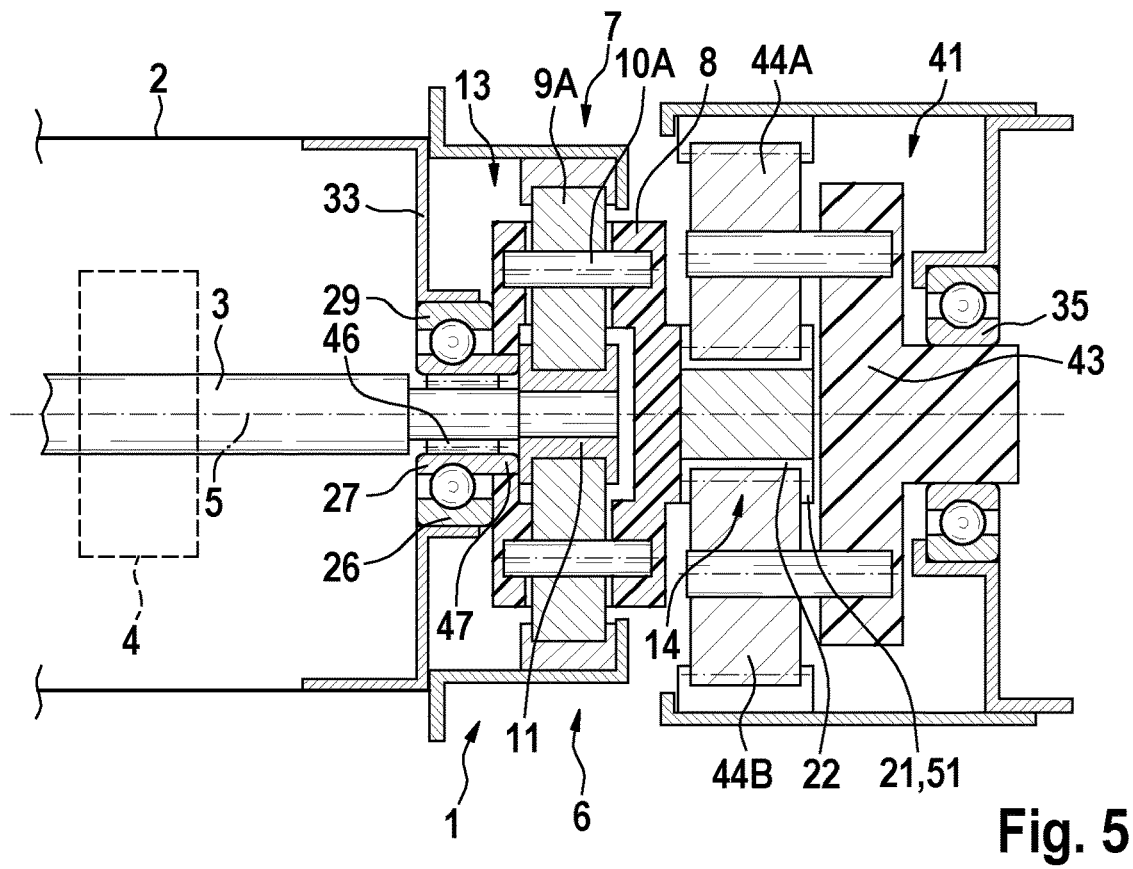
FIG. 5 shows a fifth exemplary embodiment of the braking force generator, in accordance with the present invention.

FIG. 5 shows braking force generator 1 according to a fifth exemplary embodiment. Braking force generator 1 represented in FIG. 5 differs from braking force generator 1 represented in FIG. 4, in particular, with respect to the design of first bearing 26. According to the exemplary embodiment represented in FIG. 5, second bearing ring 29 forms the outer bearing ring of first bearing 26. Second bearing shield 33 rests radially from the outside against second bearing ring 29. First bearing ring 27 forms the inner bearing ring of first bearing 26. In order to ensure that hollow shaft section 13 may nevertheless rest radially from the outside against first bearing ring 27, first bearing ring 27 includes a first axial projection 47, which projects axially from first bearing 26 in the direction of planet wheels 9. Hollow shaft section 13 rests radially from the outside against first axial projection 47. Drive shaft 3 rests radially from the inside against first bearing ring 27 with the aid of needle cage 46. Alternatively, drive shaft 3 rests radially from the inside against a third bearing ring, which then forms the inner bearing ring of first bearing 26, so that first bearing ring 27 forms a middle bearing ring of first bearing 26. Advantageously, multiple rolling elements or a sliding medium are/is then situated between first bearing ring 27 and the third bearing ring.

Figure 6:
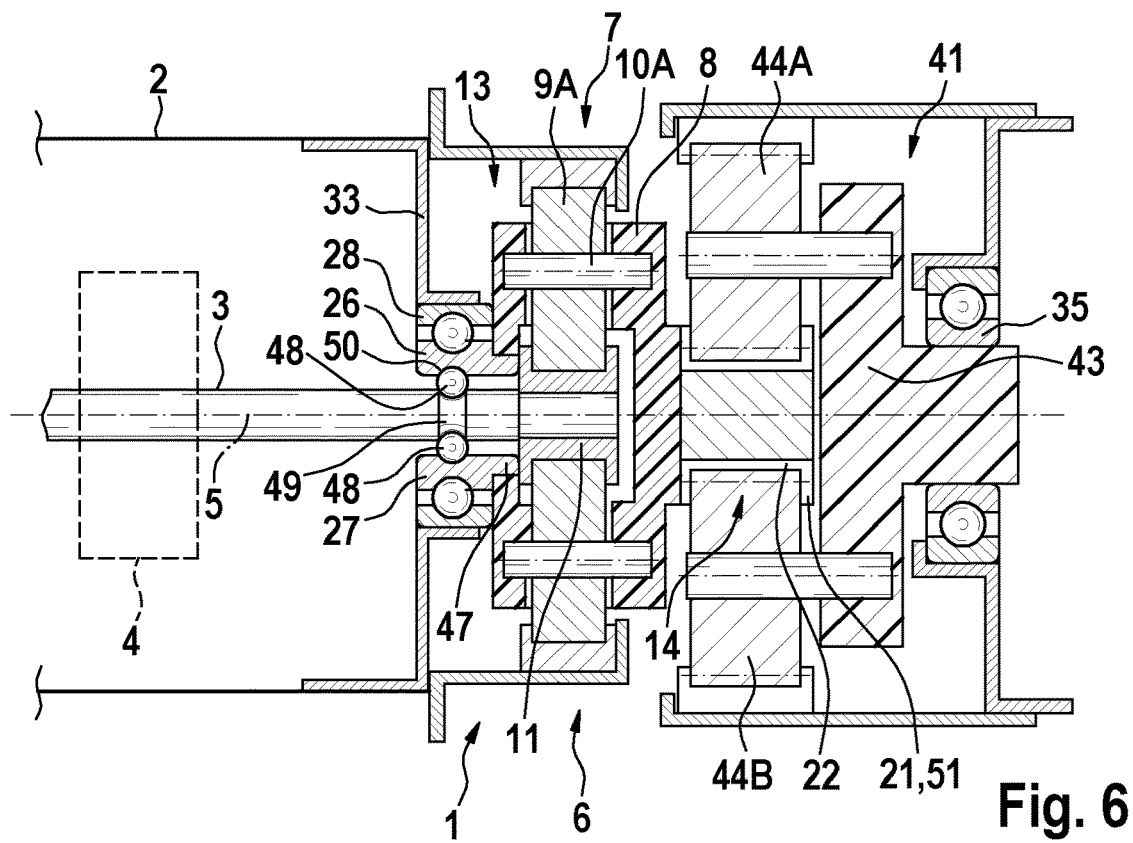
FIG. 6 shows a sixth exemplary embodiment of the braking force generator, in accordance with the present invention.

FIG. 6 shows braking force generator 1 according to a sixth exemplary embodiment. Braking force generator 1 represented in FIG. 6 differs from braking force generator 1 represented in FIG. 5 in that, instead of needle cage 46, multiple spheres 48 are provided, as rolling elements, between drive shaft 3 and first bearing ring 27. Drive shaft 3 includes a circumferential groove 49. First bearing ring 27 includes a circumferential groove 50, which is positioned radially opposite circumferential groove 49. Spheres 48 engage radially into circumferential groove 49 as well as into circumferential groove 50.

Figure 7:
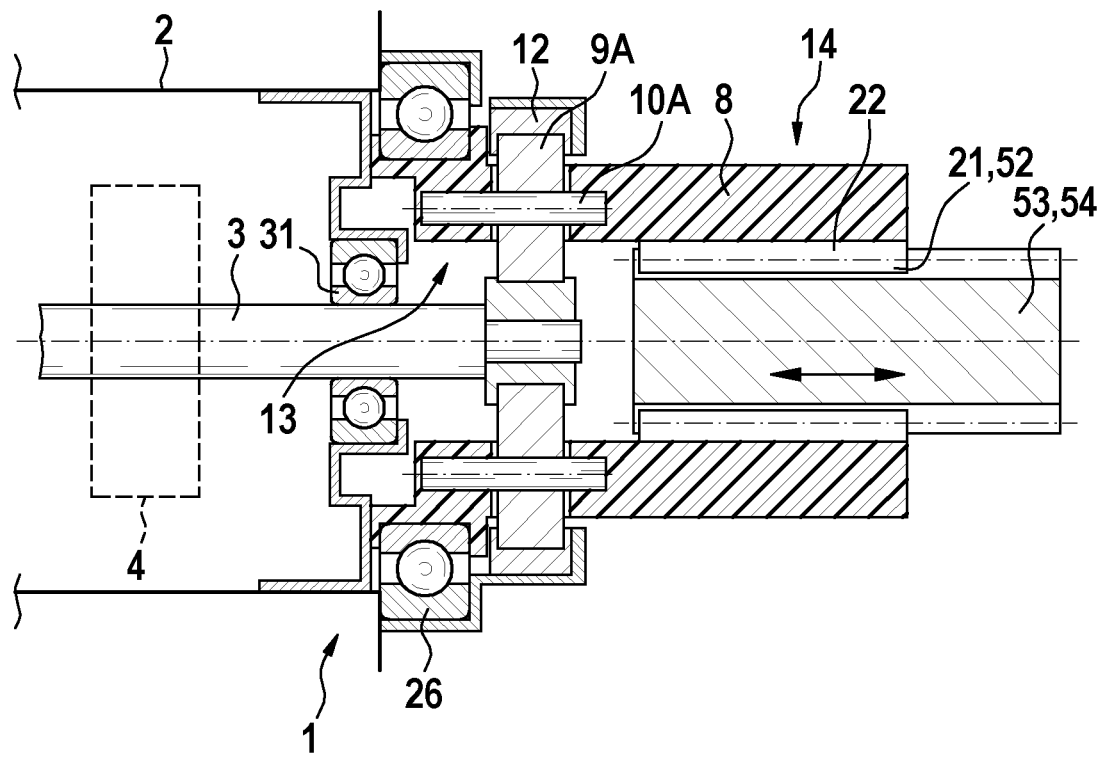
FIG. 7 shows a seventh exemplary embodiment of the braking force generator, in accordance with the present invention.

FIG. 7 shows braking force generator 1 according to a seventh exemplary embodiment. The exemplary embodiment represented in FIG. 7 differs from the exemplary embodiment represented in FIG. 1, in particular, with respect to the design of second end area 14 of planet carrier 8. According to the exemplary embodiment represented in FIG. 7, second end area 14 is designed in the shape of a hollow shaft. Output toothing 22 is formed in a lateral inner wall 52 of hollow shaft-shaped end area 14. In addition, actuating element 53 is represented in FIG. 7. In the present case, actuating element 53 is a threaded spindle 54, which is screwed into output toothing 22. An anti-rotation device (not represented) is assigned to threaded spindle 54, so that, during a rotation of planet carrier 8, threaded spindle 54 does not rotate together with planet carrier 8, but rather is axially displaced.

Figure 8:
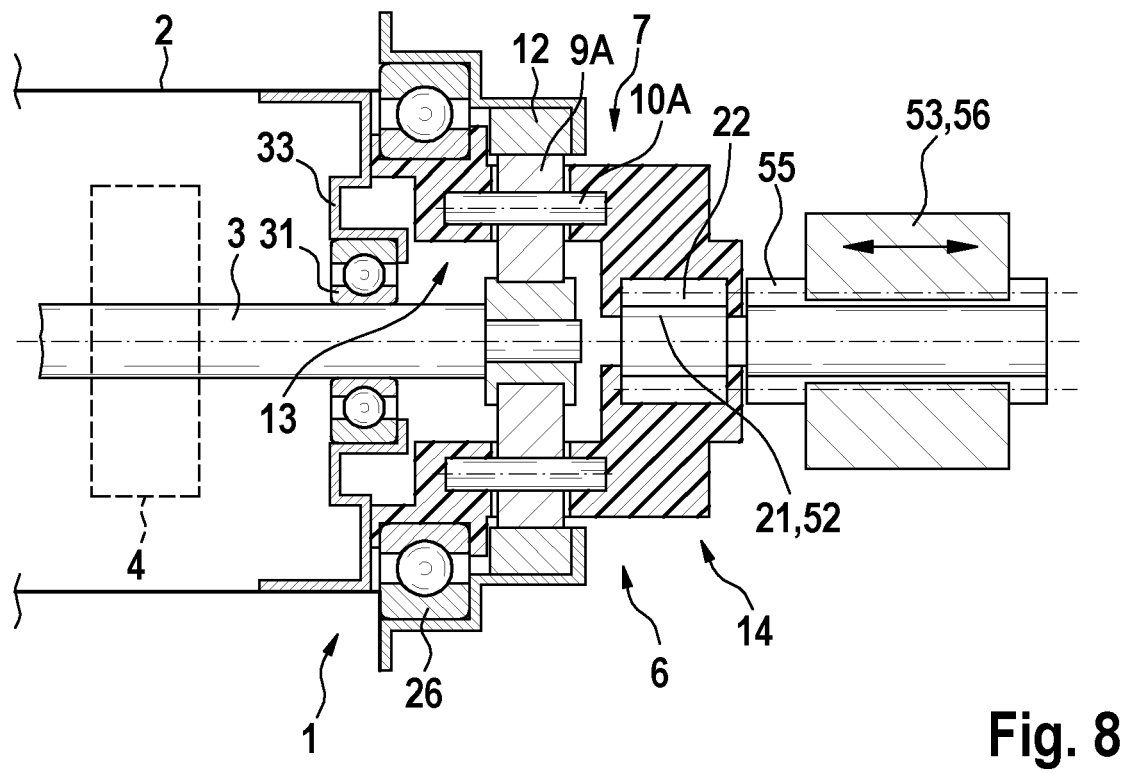
FIG. 8 shows an eighth exemplary embodiment of the braking force generator, in accordance with the present invention.

FIG. 8 shows braking force generator 1 according to an eighth exemplary embodiment. In the exemplary embodiment represented in FIG. 8 as well, second end area 14 is designed in the shape of a hollow shaft and output toothing 22 is formed in a lateral inner wall of hollow shaft-shaped end area 14. A threaded spindle 55 is screwed into output toothing 22. Alternatively, planet carrier 8 is injection-molded onto threaded spindle 55. Actuating element 53 is formed by a threaded nut 56, which is screwed onto threaded spindle 55. An anti-rotation device (not represented) is assigned to threaded nut 56, so that, during a rotation of planet carrier 8, threaded nut 56 does not rotate together with planet carrier 8, but rather is axially displaced.

What is claimed is:

1. A braking force generator for a braking system, comprising:
a drive shaft which is rotatably mounted in a housing of the braking force generator;
an electric motor, which includes a rotor and at least one motor winding, the rotor being situated on the drive shaft in a rotatably fixed manner and being rotatable via an energization of the motor winding;
an actuating element which is displaceably mounted; and
a transmission unit which operates between the drive shaft and the actuating element in such a way that the actuating element is displaced during a rotation of the drive shaft, the transmission unit including a planetary gear set;
wherein:
the planetary gear set includes:
a sun wheel connected to the drive shaft in a rotatably fixed manner;
a rotatably mounted planet carrier that includes a first section and a second section integrally formed with the first section, the first section (a) being positioned between the electric motor and the second section and (b) being a hollow tube formed of a tubular wall that surrounds an interior space in which the sun gear is arranged and that includes at least one cutout radially extending entirely through the tubular wall from the interior space to an exterior area radially exterior to the tubular wall;
an annular gear; and
for each respective one of the at least one cutout, a respective wheel shaft and a respective planet wheel rotatably mounted within the respective cutout of the hollow tube of the planet carrier so that:
(a) a center of the respective planet wheel is radially positioned within a radial region occupied by the tubular wall;
(b) the respective planet wheel extends radially through the respective cutout from the interior space to a radial exterior of the respective planet wheel;
(c) the respective planet wheel is rotatable relative to the tubular wall by spinning around the respective wheel shaft, which extends axially in a from a first axial position within a thickness of the tubular wall, through an axial position of the respective cutout, and onwards to a second axial position within the thickness of the tubular wall; and
(d) an exterior of the respective planet wheel is arranged to interact, within the interior space, with an exterior toothing of the sun wheel and, within the exterior area, with an interior toothing of the annular gear, thereby causing rotation of the planet carrier; and
a radial edge of the second section of the planet carrier is formed as an output toothing that is assigned to the actuating element so that the rotation of the planet carrier causes the output toothing to generate an axial translation motion of the actuating element.

2. The braking force generator as recited in claim 1, wherein the planet carrier is made of plastic as an injection molded part.

3. The braking force generator as recited in claim 2, wherein the planet carrier is injection-molded onto a metallic support rod using injection molding.

4. The braking force generator as recited in claim 3, further comprising:
a bearing configured to transmit a radial force, the support rod for supporting the planet carrier resting radially against a first bearing ring of the bearing.

5. The braking force generator as recited in claim 4, wherein the bearing includes the first bearing ring, a second bearing ring that is radially exterior to the first bearing ring, and multiple rolling elements at a same axial position as one another and all radially bounded by the first and second bearing rings.

6. The braking force generator as recited in claim 1, wherein the output toothing meshes directly with a toothing of the actuating element.

7. The braking force generator as recited in claim 1, wherein the transmission unit includes a second planetary gear set, a second sun wheel of the second planetary gear set being formed by the output toothing.

8. The braking force generator as recited in claim 1, wherein the second section is in the shape of a hollow shaft, the radial edge forming the output toothing being a radial inner wall of the hollow shaft-shaped second section.

9. The braking force generator as recited in claim 1, wherein at least one transmission element of the transmission unit operates between the output toothing and the actuating element.

10. The braking force generator as recited in claim 1, further comprising a bearing at an axial position that is between an axial position of the motor and an axial position of the respective planet wheel, the bearing including the following at a single axial position:
a first bearing ring against a radial interior of which a radial exterior of the first section of the planet carrier rests;
a second bearing ring that is radially exterior to the first bearing ring; and
multiple rolling elements radially bounded by the first and second bearing rings.

11. An actuating unit for a braking system, comprising:
a main brake cylinder, in which a hydraulic piston is displaceably mounted; and
a braking force generator, including:
a drive shaft which is rotatably mounted in a housing of the braking force generator;
an electric motor, which includes a rotor and at least one motor winding, the rotor being situated on the drive shaft in a rotatably fixed manner and being rotatable via an energization of the motor winding;

an actuating element which is displaceably mounted; and a transmission unit which operates between the drive shaft and the actuating element in such a way that the actuating element is displaced during a rotation of the drive shaft, the transmission unit including a planetary gear set;

wherein:

the planetary gear set includes:

a sun wheel connected to the drive shaft in a rotatably fixed manner;

a rotatably mounted planet carrier that includes a first section and a second section integrally formed with the first section, the first section (a) being positioned between the electric motor and the second section and (b) being a hollow tube formed of a tubular wall that surrounds an interior space in which the sun gear is arranged and that includes at least one cutout radially extending entirely through the tubular wall from the interior space to an exterior area radially exterior to the tubular wall;

an annular gear; and for each respective one of the at least one cutout, a respective wheel shaft and a respective planet wheel rotatably mounted within the respective cutout of the hollow tube of the planet carrier so that:

(a) a center of the respective planet wheel is radially positioned within a radial region occupied by the tubular wall;

(b) the respective planet wheel extends radially through the respective cutout from the interior space to a radial exterior of the respective planet wheel;

(c) the respective planet wheel is rotatable relative to the tubular wall by spinning around the respective wheel shaft, which extends axially from a first axial position within a thickness of the tubular wall, through an axial position of the respective cutout, and onwards to a second axial position within the thickness of the tubular wall; and (d) an exterior of the respective planet wheel is arranged to interact, within the interior space, with an exterior toothing of the sun wheel and, within the exterior area, with an interior toothing of the annular gear, thereby causing rotation of the planet carrier;

a radial edge of the second section of the planet carrier is formed as an output toothing that is assigned to the actuating element so that the rotation of the planet carrier causes the output toothing to generate an axial translation motion of the actuating element; and the hydraulic piston is displaceable via a displacement of the actuating element.

* * * * *